United States Patent [19]

Glass et al.

[11] Patent Number: 5,224,861
[45] Date of Patent: Jul. 6, 1993

[54] TRAINING DEVICE ONBOARD INSTRUCTION STATION

[75] Inventors: Richard H. Glass, Springfield; George D. Smith, Broadrun; Charles G. Smith, III, Centreville; Andris Plavnieks, Fairfax; William T. Tilghman, Sterling, all of Va.; Russell F. O'Brien, Riverside, Calif.

[73] Assignee: Hughes Aircraft Company, Los Angeles, Calif.

[21] Appl. No.: 583,123

[22] Filed: Sep. 17, 1990

[51] Int. Cl.$^5$ .................. G09B 9/08; G09B 19/16
[52] U.S. Cl. ........................ 434/35; 434/30; 434/55; 273/434; 340/712; 340/717; 358/104; 244/118.5; D6/338
[58] Field of Search .......... 434/29, 30, 35, 38, 434/43, 44, 219, 322, 336, 350, 365, 372; D6/336, 335, 338, 341, 397, 644; D12/192; 244/118.5, 1 R; 364/578; 340/707, 712, 717; 358/93, 241, 254, 229, 104; 273/434, 85 G, DIG. 28

[56] References Cited

U.S. PATENT DOCUMENTS

| | | | |
|---|---|---|---|
| D. 260,823 | 9/1981 | Stulik, Jr. | D6/335 |
| 4,207,688 | 6/1980 | Dederian et al. | 434/55 X |
| 4,310,839 | 1/1982 | Schwerdt | 340/712 |
| 4,529,150 | 7/1985 | Owen et al. | 244/118.5 X |
| 4,584,603 | 4/1986 | Harrison | 273/DIG. 28 X |
| 4,584,786 | 4/1986 | Georgopulos | 340/717 X |
| 4,697,231 | 9/1987 | Boytor et al. | 340/712 X |
| 4,743,895 | 5/1988 | Alexander | 340/712 |
| 4,756,528 | 7/1988 | Umashankar | 273/DIG. 28 X |

Primary Examiner—Richard J. Apley
Assistant Examiner—Joe H. Cheng
Attorney, Agent, or Firm—Wanda K. Denson-Low

[57] ABSTRACT

An onboard instructor station for a training device provides a human/computer interface that is designed to support an optimum instructor's scan pattern of the training scenario. All displays and switches required to control and monitor the mission are resident at the instructor's work surface directly in front of, and tangent to the instructor's seated position. This design allows for a dedicated over-the-shoulder observation position. Therefore, the instructor may simultaneously observe trainees' actions, a visual scene and device instrumentation while controlling and monitoring the training environment through embedded situational awareness displays and corresponding switches at the work surface. The unique aspect of this design is the one position from which all tasks can be accomplished through the support provided by the packaging. This packaging employs flat panel displays which replace the traditional, larger CRT units.

13 Claims, 10 Drawing Sheets

FIG. 4
FIG. 4A
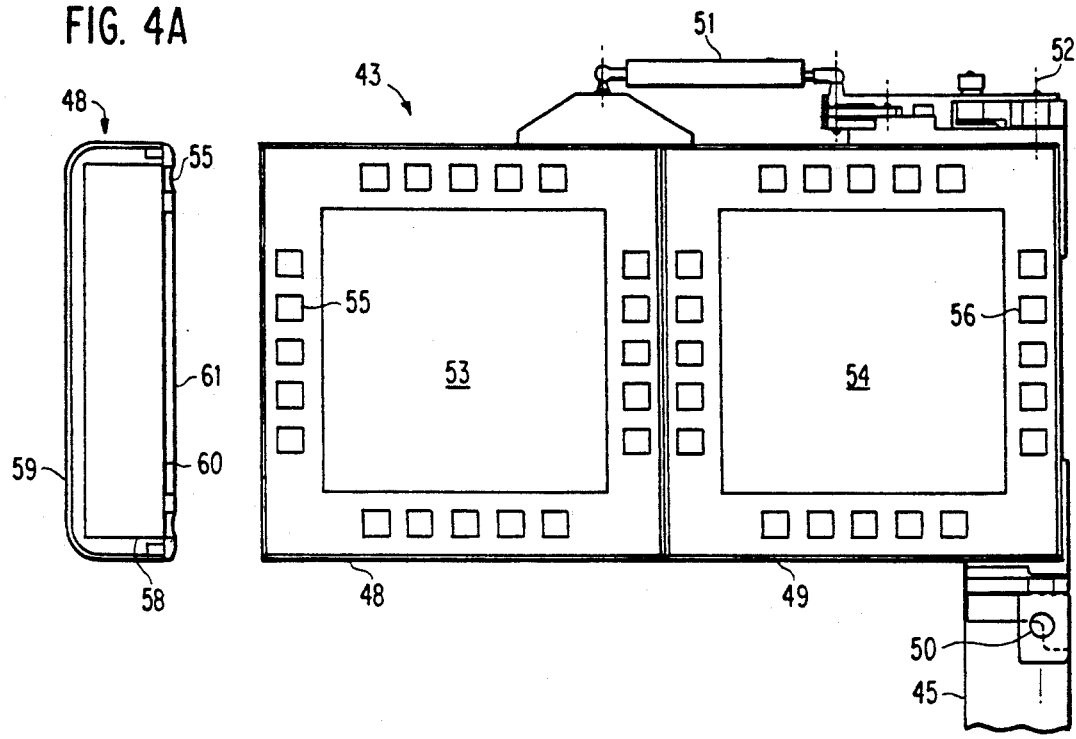
FIG. 5
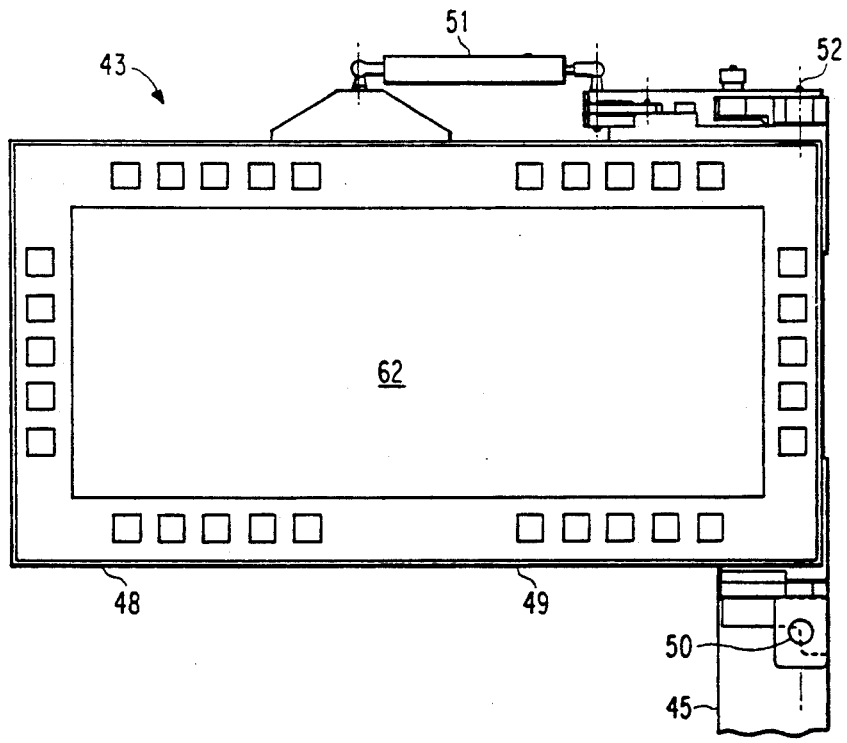

FIG. 12

```
15 JAN 90                                              01:23:45
01:23:00
                                    113.6 EWN   ▫
                                    DME CH 83

CH 75 NKT  ᖱ

ᖱ  CH 101 NCA
                        ⚹
─────────────────────────────────────────────────────────────────
1. MFD NO.1                     6. TACAN
2. AC BUS CNTLR                 7. VOR/ILS
3. RENG FIRE TEST               8. RADAR ALTIMETER
4. RWING FIRE DETECTOR          9.
5. NIU NO.1                    10.
─────────────────────────────────────────────────────────────────
1. LENG FAIL          01:30:00  11. LENG OIL TMP HI        O
2. RENG OVRTMP                  12. RENG OIL QTY LO        V
3. RENG DEBRIS WRN              13.                        E
4. RENG CMPRSR STAL             14.                        R
5. RENG NG IND FAIL             15.                        R
6. RENG NP IND FAIL             16.                        I
7. LENG TORQ IND FAIL    GD     17.                        D
8. RENG ABECS FAIL              18.                        E
9. RENG UNDRSPD                 19.
10. RENG OIL PR LO              20.
─────────────────────────────────────────────────────────────────
  •       MARK      [MALF]      ← PRINT →
```

TRAINING DEVICE ONBOARD INSTRUCTION STATION

BACKGROUND OF THE INVENTION

1. Field of the Invention

The present invention generally relates to computer-aided training devices of the type commonly referred to as simulators and, more particularly, to the type of training devices which include an onboard instructor's console. Training devices of this type include simulators for vehicles such as transport aircraft, ships and large land vehicles and simulators for fixed station facilities such as power generators and chemical processes.

2. Description of the Prior Art

Training devices or simulators present scenes to a trainee to allow the trainee to practice some task, such as flying an airplane. In a flight simulator, for example, a three-dimensional model of the desired "gaming area" is prepared and stored on magnetic disk or similar bulk storage media. The visual simulator combines an image generator with an electro-optical display system such as a cathode ray tube (CRT) or similar display. The image generator reads in blocks of three-dimensional data from the disk and transforms this data into two-dimensional scene descriptions. The two-dimensional data are converted to analog video that is presented to the trainee via the display. The generated imagery is meant to be representative of the true scenes that the trainee would see if the trainee were actually performing the task being simulated. The generation of the display images is said to be in "real time" which is normally taken to mean 30 frames per second, as in the U.S. television standard. Computer image generating (CIG) systems are described in detail in the book entitled *Computer Image Generation* edited by Bruce J. Schacter and published by Wiley-Interscience (1983).

There are basically two types of simulators used for training purposes; those having an instructor's console on the simulator floor and those where the instructor's console is onboard. An example of the former type is a simulator for high performance aircraft, usually of the single-place variety. The present invention is specifically directed to the latter type of simulator where an instructor or senior crew member is on board the simulator with the trainees as part of the training mission. This would include any crew served vehicles but could include other training environments such as power plants, refining plants and the like.

The prior parallel configuration that supported instructor station facilities contained CRT displays with adjacent switch panels as part of the instructor's console. This type of display necessitated locating the instructor's console away from the trainees' positions. The arrangement was such that the instructor would have to sit at the instructor's console to control the training environment and then move to a position behind the trainees to observe the trainees' actions. In this latter position, the instructor could also observe the visual scene presented to the trainees, but when sitting at the instructor's console, the visual scene, including any instrumentation, was not readily observed by the instructor. Therefore, it was necessary to replicate much of the training environment at the instructor's console.

An example of the prior onboard instructor station is illustrated in FIG. 1. This figure is a plan view of the interior of a simulated aircraft cockpit and supporting instructor station structure 10 for an aircraft simulator. Entry to the simulator platform is by means of a door 11. This platform is provided with CIG displays generally indicated at 12 which present a visual scene to the trainees through the cockpit windshield 13. There are two trainee positions; one for the pilot at 14 and the other for the co-pilot at 16. Along the axis of the cockpit are a pair of tracks 17 and 18 on which are mounted an instructor's seat 20 and an observer's seat 22. The observer's seat is shown at the back of the cockpit in its stowed position. The instructor's seat is shown facing an instructor's console 23 which includes two CRT displays 24 and 25 and a work surface 26. In addition the to the instructor's console, there is schematically indicated an onboard I/O (input/output) rack 27 which provides the connections to simulator computer system (not shown) on the simulator floor.

In use, a training session begins by the instructor entering commands at the instructor's console 23 to invoke a desired training environment. Once the inputs have been made at the instructor's console, the instructor can swivel seat 20 counter clockwise by 90° and move it forward on the tracks 17 and 18 so that the instructor is just behind the right shoulder of the co-pilot and the left shoulder of the pilot. In this position, the instructor can observe the actions of the pilot and co-pilot over their shoulders and also observe the visual environment, including both the imagery produced by the CIG displays 12 and the instrumentation at both the pilot's and co-pilot's positions. However, when the instructor needs to adjust or change the training environment, it is necessary to move the seat 20 back on tracks 17 and 18 and to swivel it clockwise 90° to again have access to the instructor's console 23. In so doing, the instructor cannot easily observe the visual environment presented to the trainees, the cockpit instrumentation or the trainees' actions. This presents a problem in the continuity of the training session.

SUMMARY OF THE INVENTION

It is therefore an object of the present invention to provide a training device or simulator with a full time over-the-shoulder instructional position from which no changes in the forward-facing posture of the instructor are necessary to control and monitor the training mission.

It is another object of the invention to provide an instructor's position in an onboard instructor station which makes possible a unidirectional scan pattern by the instructor to observe trainees' actions, the simulated environment and the human/computer interface for the instructor.

It is a further object of the invention to provide an efficient packaging of the instructor's controls and display for an onboard instructor station of a training device allowing a single instructor position and eliminating displays and work surface required for the prior instructor console.

According to the invention, the onboard instructor station for a training device provides a human/computer interface that is designed to support an optimum instructor's scan pattern of the training scenario. All displays and switches required to control and monitor the mission are resident at the instructor's work surface directly in front of, and tangent to the instructor's seated position. This design allows for a dedicated over-the-shoulder observation position. Therefore, the instructor may simultaneously observe trainees' actions, a visual scene and device instrumentation while controlling and monitoring the training environment through embedded situational awareness displays and corresponding switches at the work surface. The unique aspect of this design is the one position from which all tasks can be accomplished through the support provided by the packaging. This packaging employs flat panel displays which replace the traditional, larger CRT units.

BRIEF DESCRIPTION OF THE DRAWINGS

The foregoing and other objects, aspects and advantages will be better understood from the following detailed description of a preferred embodiment of the invention with reference to the drawings, in which:

FIG. 4 is a plan view of the instructor's flat panel display and control assembly;

FIG. 4A is a cross-sectional view of one of the flat panel displays shown in FIG. 4;

FIG. 5 is a plan view of an alternative configuration of the instructor's flat panel display and control assembly;

FIG. 12 is a display page showing a windowing function when the MALF (malfunction) button is pressed during the display of the page shown in FIG. 11.

DETAILED DESCRIPTION OF A PREFERRED EMBODIMENT OF THE INVENTION

Figure 2:
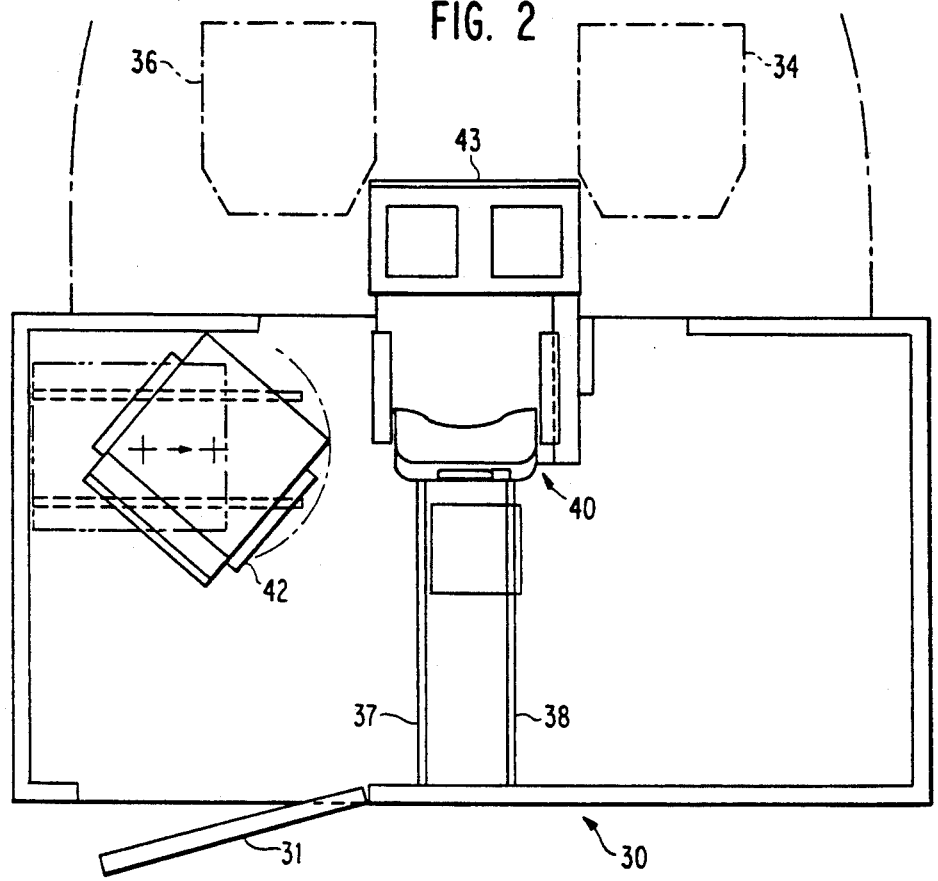
FIG. 2 is a plan view of the interior of a simulator cockpit showing the onboard, forward looking instructor station according to the present invention.
Figure 3:
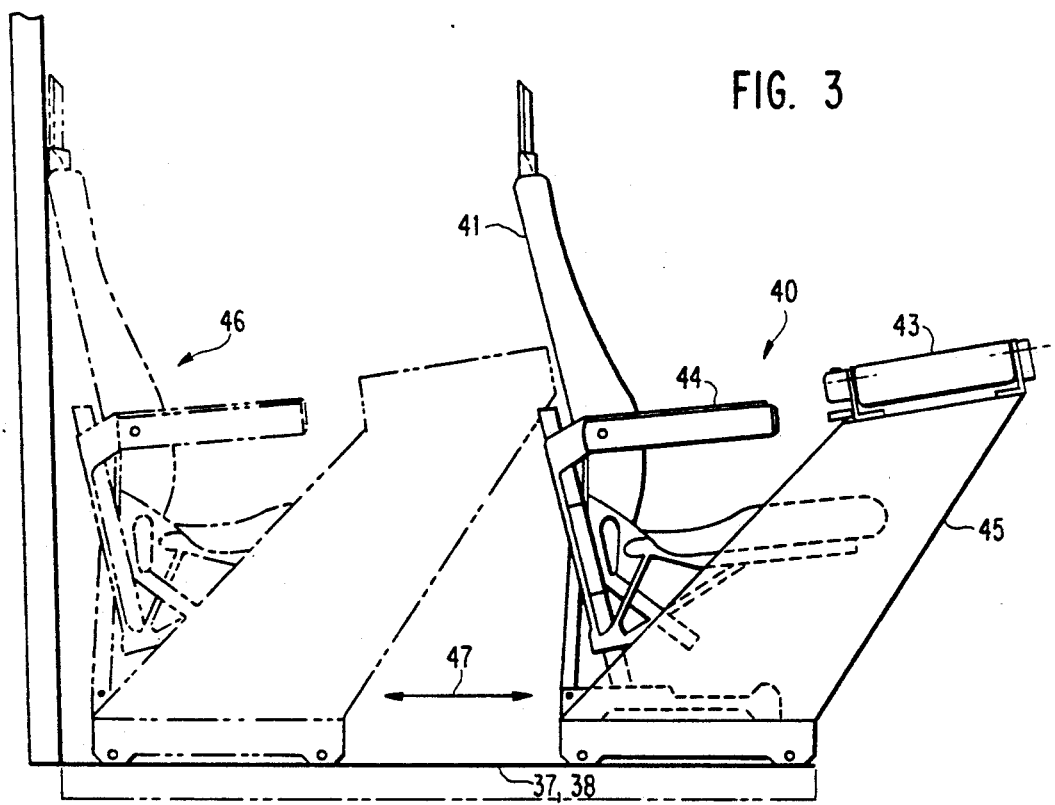
FIG. 3 is a profile view of the instructor station according to the invention.

Referring now to the drawings, and more particularly to FIGS. 2 and 3, there are shown respectively a plan view and a profile view of the onboard instructor station according to a preferred embodiment of the invention. FIG. 2 shows the interior of a simulated aircraft cockpit and supporting instructor station structure 30 for an aircraft simulator, entry to which is by means of a door 31. The cockpit is provided with CIG displays (not shown) as before. There are two trainee positions; one for the pilot at 34 and the other for the co-pilot at 36. Along the axis of the cockpit are a pair of tracks 37 and 38 on which is mounted the instructor station 40. As best seen in FIG. 3, the instructor station 40 is an integral unit comprising the instructor's seat 41, work surface 43 with embedded displays and switches, and the work surface support structure 45. An observer's seat 42 is provided on the left side of the tracks 37 and 38. The observer's seat is shown pulled away from the wall of the cockpit and swiveled counter clockwise approximately 45° to provide a view of the training session. The instructor station 40 is shown pulled forward on tracks 37 and 38. This is the normal position of the instructor station during a training session. The instructor station 40 is moved backward on tracks 37 and 38 only to allow ingress and egress by the trainees to their respective seats. It will be observed that there is no separate instructor's console. Moreover, it is not necessary for the instructor station 40 to swivel since all functions performed by the instructor are in the forward facing position. The functions of the instructor's console are replaced by the flat panel display assembly 43 which is a part of the instructor station 40.

As best seen in FIG. 3, the instructor station includes the seat 41 having foldable arm rests 44 and mounted on the tracks 37, 38, which are flush with the floor. The foldable arm rests 44 may be individually pivoted up or down according to the preference of the instructor. In addition, the armrest 44 (FIG. 3) on the left side of the seat 40 can be rotated upwardly to further improve the access.

Attached to the seat 41 is a support structure 45 to which the flat panel display assembly 43 is attached. This attachment is hinged to provide a rotation of 90° from the horizontal position to a vertical up and locked position for instructor ingress and egress. The instructor station is shown in phantom outline in its stowed position 46 illustrating the fore and aft movement of the instructor station along tracks 37, 38, as indicated by the double headed arrow 47.

FIG. 4 shows the flat panel display assembly 43 as comprising two panels 48 and 49. In the embodiment shown in FIG. 4, a damper 51 is provided to prevent the display assembly from rapidly rotating from the vertical to the horizontal position with such force that might damage the display assembly. The display assembly 43 is attached to the support structure 45 by means of a hinge to permit the display assembly 43 to rotate about center line 52 to a 90° vertical position. A lock (not shown) holds the display assembly in the vertical position.

With the flat panel assembly 43 in the position shown in FIG. 4, it presents a work surface having embedded therein two displays 53 and 54, each with a bezel containing twenty push button switches 55 and 56. In addition, there is provided a slew button 50 in the support structure 45. The slew button operates like a track ball or joy stick, allowing the instructor to move a display indicator (e.g., a cursor) to select different values depicted on a display page. For example, when values of such variables as latitude, longitude, altitude, heading and airspeed are displayed, the instructor can use the slew button 50 to move the display indicator to a desired value and then select that value by depressing the slew button.

Figure 1:
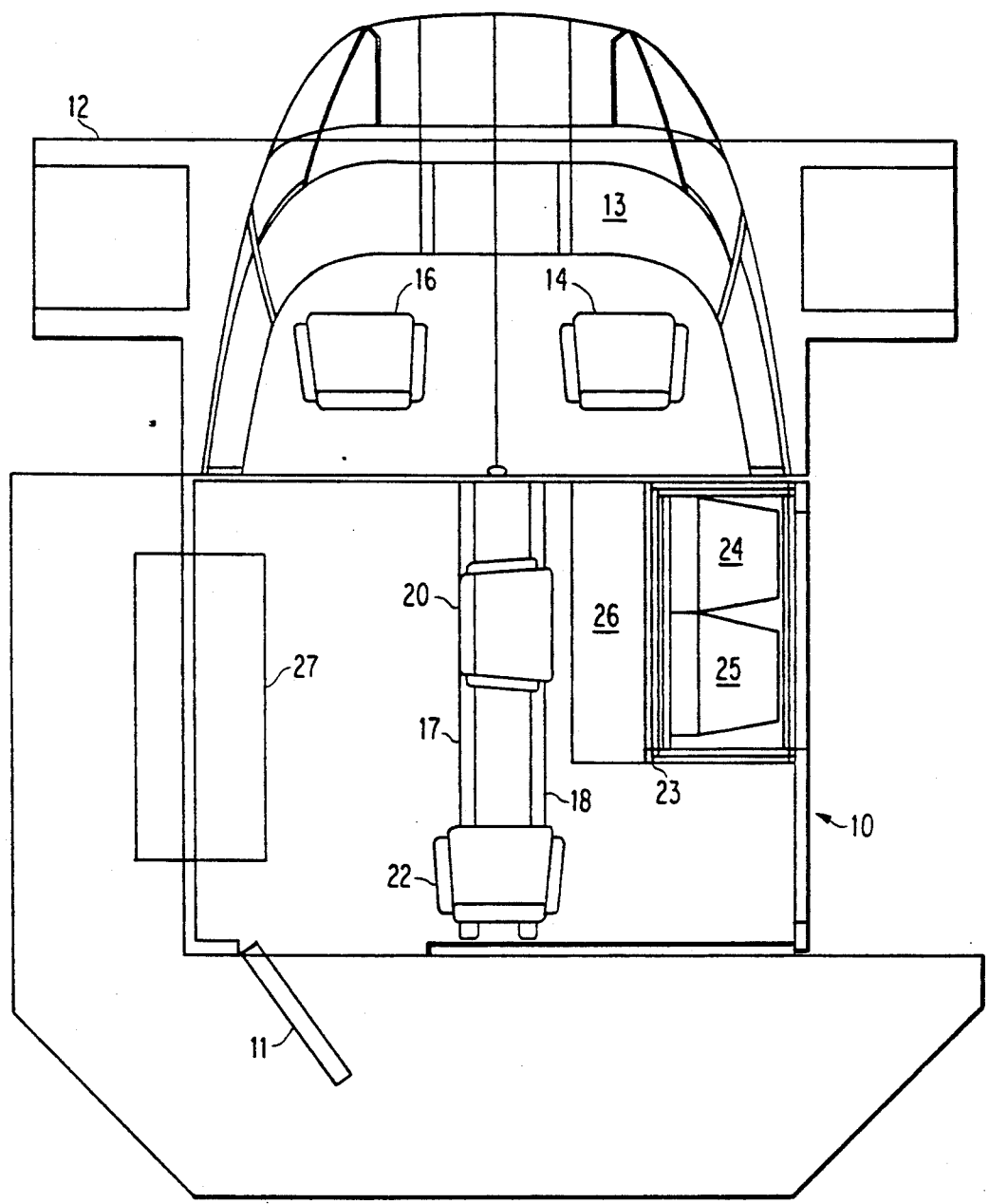
FIG. 1 is a plan view of the interior of a simulated aircraft cockpit and supporting instructor's station structure depicting a prior art onboard instructor's station.

In a preferred embodiment, the two displays 53 and 54 are implemented using gas plasma displays approximately eight inches square. The panels themselves are approximately twelve inches square, providing a combined surface of approximately twelve by twenty-four inches. FIG. 4A shows a cross-sectional view of flat panel assembly 43. The plasma display 58 is housed within a case 59 having a thickness of approximately three inches. An optical filter 60 is provided over the plasma display 58 to suppress glare, and over the filter 60 is a clear plastic 61. The clear plastic not only protects the plasma display 58, it also provides the instructor with a writing surface. Thus, it will be appreciated from FIG. 4 that the top surface of the flat panel display assembly 43 provides the instructor all the functions of two displays, control switches and a work surface formerly provided by the console 23 shown in FIG. 1.

While the preferred embodiment of a specific implementation uses two gas plasma displays and embedded switches, other displays and switch functions may be preferred depending on the application. For example, a single display 62, as shown in FIG. 5, may be substituted for the two displays 53 and 54 shown in FIG. 4. The display or displays may be implemented with other flat panel display technologies including, but not limited to, liquid crystal display (LCD) technology. In fact, a color LCD type of display could have significant advantages where color can be employed as representing information to the instructor.

Also, supplementing the embedded push button switches in the bezel surrounding the display screen, a touch screen can be used and the switch functions can be depicted on a display page. A suitable technology for the touch screen is surface acoustic wave. This type of touch screen will respond only to a finger touching the display screen and not to larger objects, such as a note pad, so that the work surface can be used as a writing surface without unintentionally inputting commands and selections.

Figure 6A:
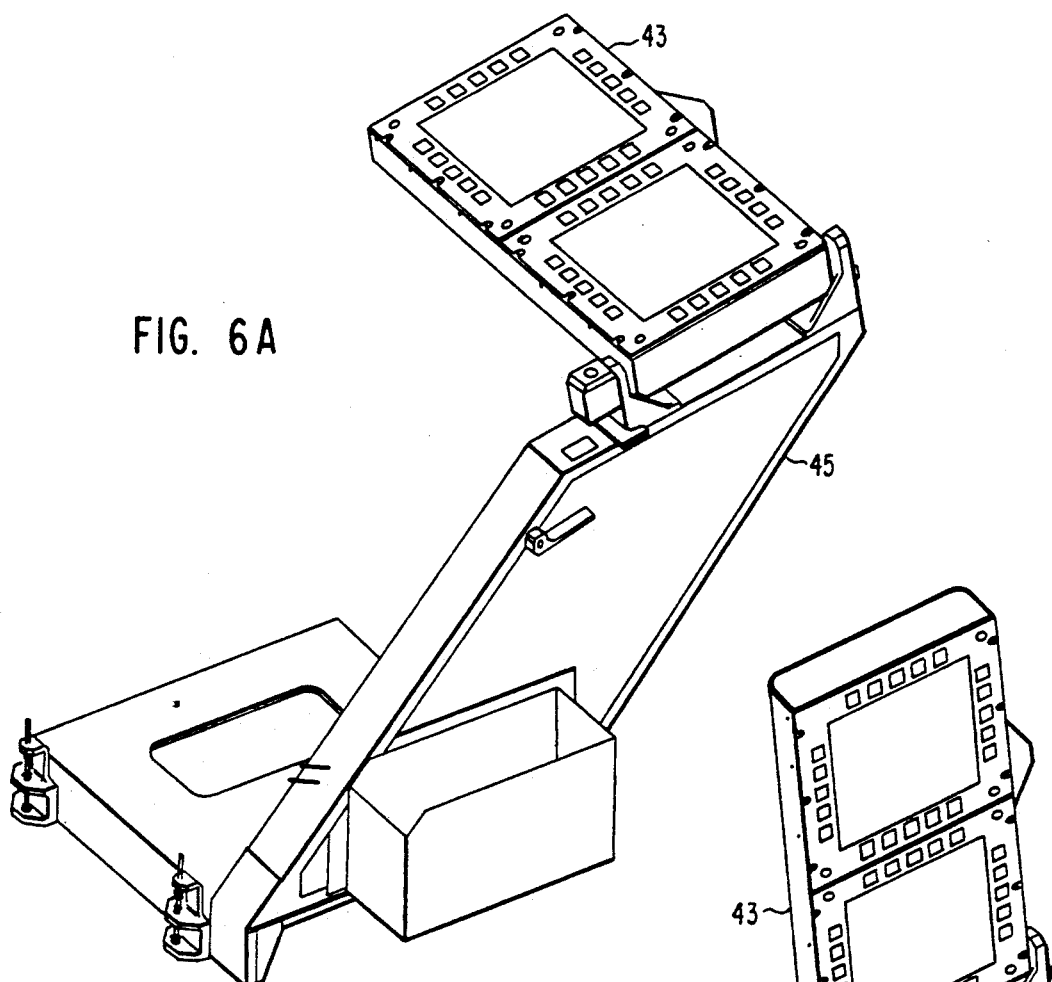
FIGS. 6A and 6B are perspective views of a portion of the instructor station showing the movement of the flat panel display and control assembly.
Figure 6B:
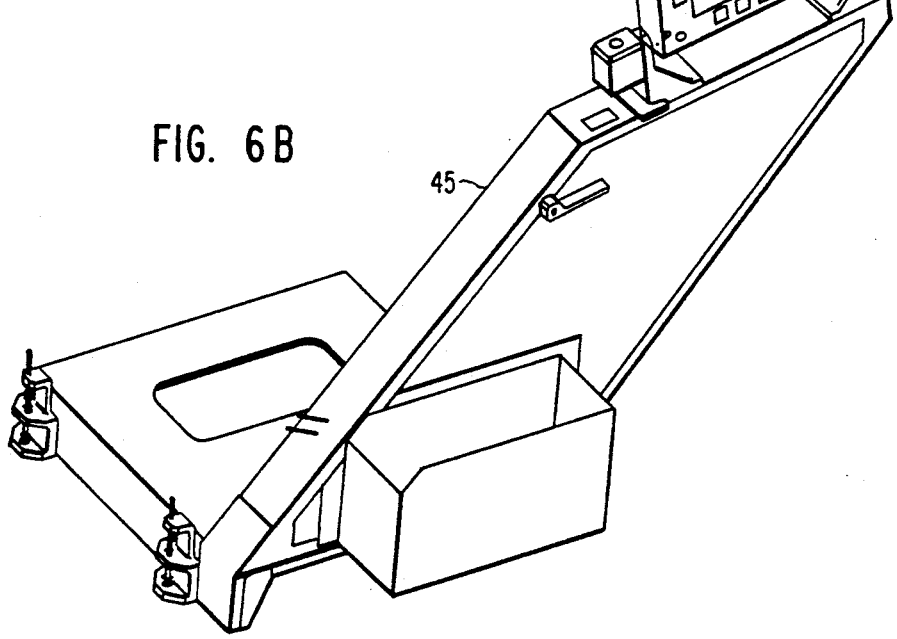

Whatever the implementation, the display assembly 43 is compact and easily moved from a horizontal to a vertical position as illustrated in FIGS. 6A and 6B, respectively. In addition to being compact, the display assembly 43 provides a highly flexible human/computer interface for the instructor. The push button bezel mounted switches, when actuated, provide the instructor with a tactile feedback to confirm that the appropriate switch action has been completed. Human engineering principles support this mechanism wherein the instructor's primary scan remains forward on the trainees' actions without diverting attention to confirm switch actuation at the instructor's work surface.

Figure 7:
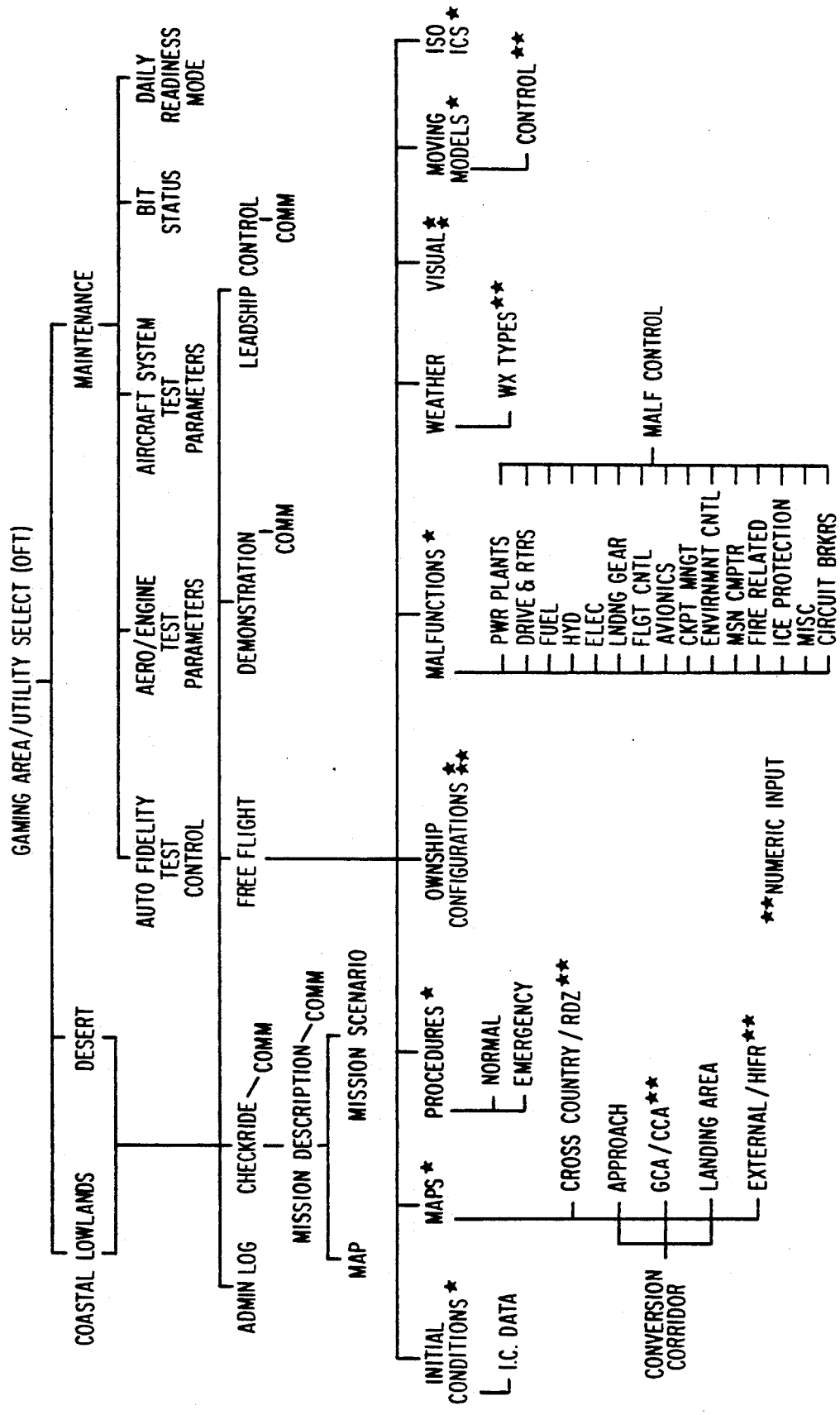
FIG. 7 is hierarchical tree of display pages depicted in one implementation of the invention.

In the embodiment shown in FIG. 4, functions of switches 55 and 56 are programmable to be display dependent with display pages depicted on displays 53 and 54. By way of example, FIG. 7 shows a specific display page hierarchy of an instructor station implemented in a flight simulator. At the top of the hierarchy, the instructor may select a gaming area, coastal lowlands or desert, and maintenance utilities. Assuming that a gaming area is selected, the instructor can select various training procedures, one of which is "checkride". Selecting the checkride option provides the instructor with several other options which control the training environment.

Figure 8:
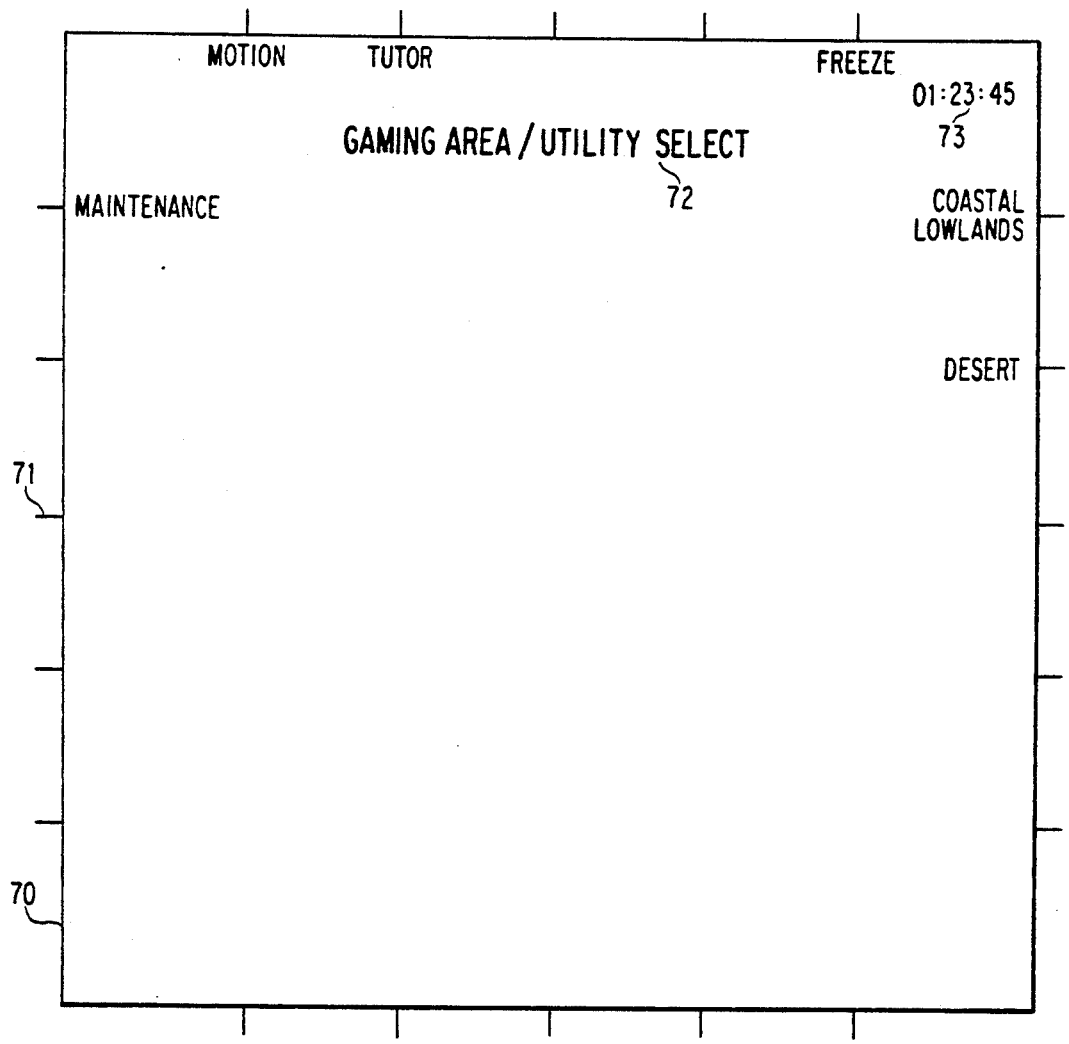
FIG. 8 is the initial display page depicted at the top of the hierarchical tree shown in FIG. 7.

The manner in which the instructor accesses the various functions and inputs commands during the training session is illustrated in the following figures. Referring first to FIG. 8, there is shown the initial display page 70 corresponding to the top of the hierarchy shown in FIG. 7. This is the gaming area/utility display page. The marks 71 about the periphery of the display page indicate the positions of the push button switches embedded in the bezel surrounding the display. The title of the display page is displayed at 72, and in the upper right hand corner, the mission time is displayed at 73. Along the left hand edge of the display page, there is but one function displayed and that is "maintenance".

Along the right hand edge of the screen, two functions are displayed, and they are "coastal lowlands" and "desert". Only the push button switches for which a function is displayed are operational for this particular screen. Along the top edge of the screen, three commands, "motion", "tutor" and "freeze" are displayed. No selections are provided for the push button switches at the bottom edge of the screen.

Figure 9:
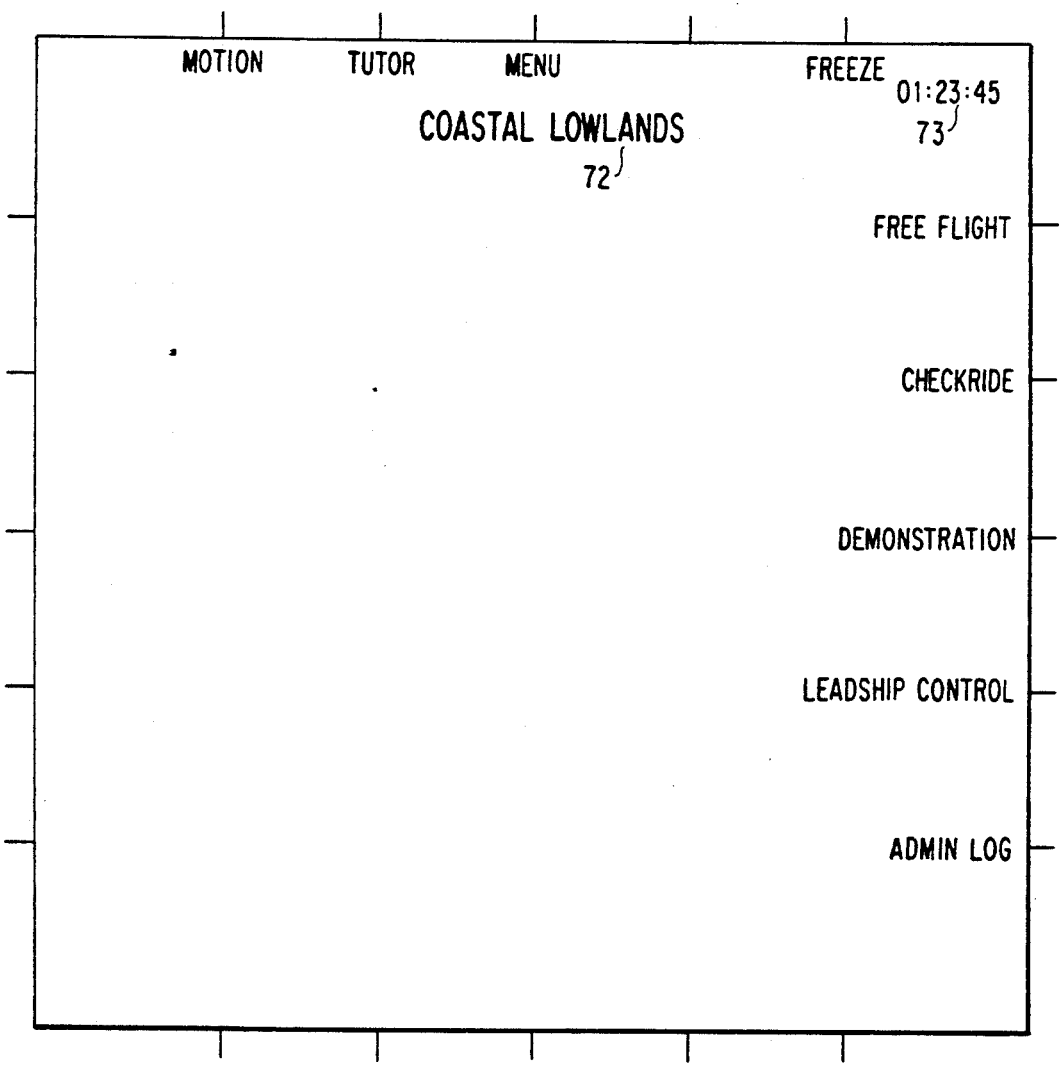
FIG. 9 is a page displayed as a result of a selection made from the initial screen shown in FIG. 8.

Should the instructor select the coastal lowlands option, the display page shown in FIG. 9 is next presented to the instructor. Notice that the title of the screen at 72 changes to reflect the name of the screen currently being displayed and that the mission time continues to be displayed at 73. In the display page shown in FIG. 9, various functions are displayed along the right edge of the display, and these are different from those of the previous display page. Therefore, the functions of the push button switches have changed. In addition, there is now an additional command, "menu", displayed at the top edge of the display. Selecting this command returns the display page at the top of the hierarchy shown in FIG. 8.

Figure 10:
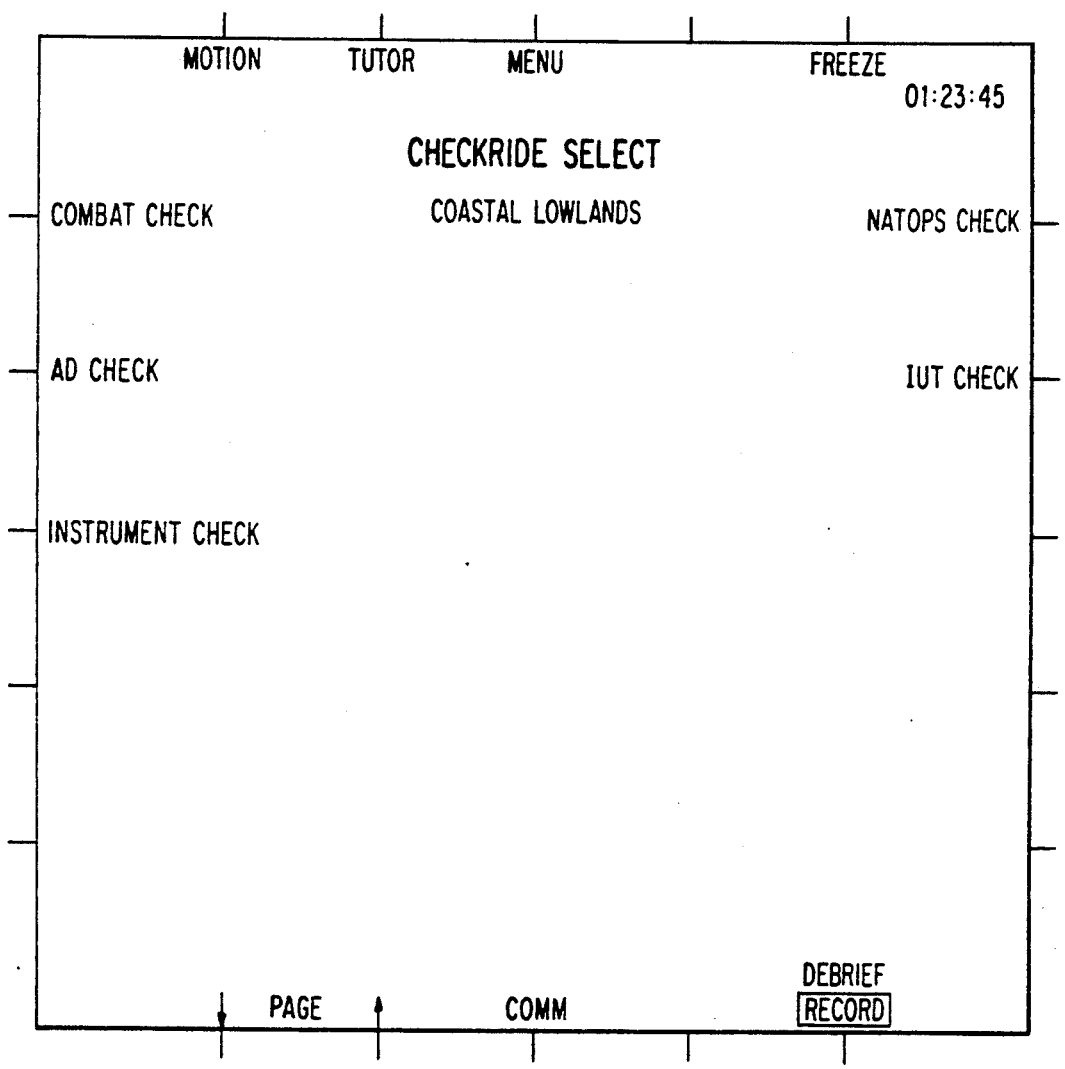
FIG. 10 is a page displayed as a result of a selection made from the screen shown in FIG. 9.

If the instructor selects the "checkride select" function by pressing the corresponding push button switch adjacent the display in FIG. 9, the screen shown in FIG. 10 is next displayed. Thus, it is possible for the instructor to navigate through a hierarchy of screens as generally indicated in FIG. 7.

Figure 11:
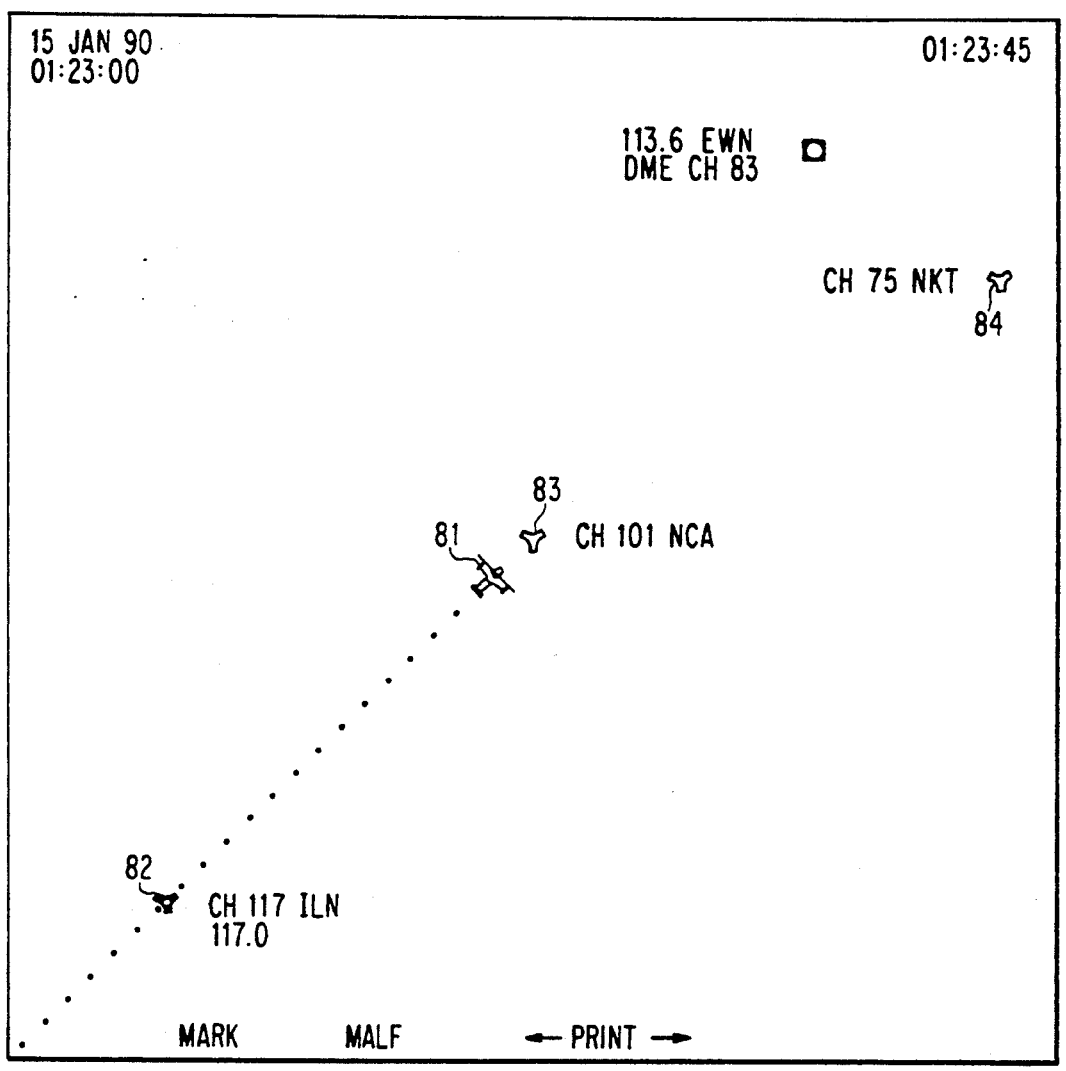
FIG. 11 is a display page showing the gaming area in the form of a map and own ship's position with controls that may be exercised by the instructor.

The screens shown in FIGS. 8, 9 and 10 illustrate a succession of display pages which may be displayed on one of the display screens 53 and 54. Situational display pages are provided on the other of these two panels allowing the instructor full control over the training session. An example of a situational display is shown in FIG. 11 where ownship position 81 is shown on a map relative to navigational points 82, 83 and 84, such as TACAN stations. At the bottom of this display page are commands "mark", "malf" (for malfunction) and "print". The arrows adjacent the "print" command indicate which of the two display pages are to be printed.

If the "MALF" command push button switch is pressed, the windowed display page shown in FIG. 12 is presented to the instructor. The windows depict the activated circuit breakers and malfunctions that are active in the simulation.

Within the training device industry, the present invention provides a human/computer interface that supports the concept of over-the-shoulder instruction for the entire crew from an integrated instructor station. Training devices that require onboard instructor positions are all potential candidates for the invention. The applications span both military and civilian applications. The invention applies to all crew served vehicles, such as aircraft and ships, where an instructor's presence is required. The instructor station is an integral unit supported by a remotely located industry standard graphics workstation; therefore, the invention can be implemented as a stand alone workstation in a training environment where the instructor's or senior crew member's skills are necessary to the training mission.

As mentioned the display can be implemented in any of several flat panel display technologies. The human/computer interface can be further augmented by the software supporting the instructor station. For example, instead of using programmable switches, extensive use can be made of "point-and-shoot" software interfaces using a pointing cursor controlled by the slew button 50. These software interfaces generally employ command bars and pop-down menus to allow the user to make selections and input commands.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A simulator training system comprising:
   a computer controlled system for providing realistic user interface for a simulated device to present a training scenario for at least one trainee, said computer controlled system being responsive to actions of said at least one trainee during a training scenario to generate outputs as a consequence of those actions;
   at least one training position allowing said at least one trainee to view the training scenario and preform actions in response to the training scenario; and
   an instructor control system controlling said computer controlled system including:
   an instructor's seat in a dedicated over-the-shoulder observation position relative to the at least one training position for allowing an instructor to view the training scenario and the actions of said at least one trainee;
   a display support structure attached to said instructor's seat; and
   a display assembly including a flat panel display embedded in an integral work surface and providing display and switch functions required to provide instructor input to said computer controlled system, said display assembly being attached to said support structure by a hinge means for allowing said display assembly to be rotated 90° to a vertical position to allow ingress and egress from the instructor's seat, said display assembly providing an instructor interface with said computer controlled system for controlling and monitoring a training scenario without obstructing the over-the-shoulder observation of the training scenario and actions of the at least one trainee.

2. The simulator training system as recited in claim 1 wherein said integral work surface is formed by a clear plastic overlay of said flat panel display.

3. The simulator training system as recited in claim 1 wherein said flat panel display is a liquid crystal display.

4. The simulator training system as recited in claim 1 wherein said flat panel display is a gas plasma display.

5. The simulator training system recited in claim 1 wherein said display assembly is lockable in said vertical position and further comprising damper means for preventing said display assembly from rotating to a horizontal position so as to damage the display assembly.

6. The simulator training system as recited in claim 1 further comprising a bezel surrounding said flat panel display and a plurality of push button switches embedded in said bezel, said push button switches being programmable to have different functions when the display changes.

7. The simulator training system as recited in claim 1 wherein said display assembly includes two flat panel displays, each of said flat panel displays being surrounded with a bezel, further comprising a plurality of push button switches embedded in the bezel of each of said flat panel displays, said push button switches being programmable to have different functions when the display changes.

8. The simulator training system as recited in claim 7 wherein each of said flat panel displays are gas panel displays.

9. The simulator training system as recited in claim 7 wherein each of said flat panel displays are liquid crystal displays.

10. The simulator training system as recited in claim 1 wherein said flat panel display is a touch screen display.

11. The simulator training system as recited in claim 10 further comprising a bezel surrounding said flat panel display and a plurality of push button switches embedded in said bezel, said push button switches being programmable to have different functions when the display changes.

12. The simulator training system as recited in claim 1 further comprising slewing means for allowing control of a displayed indicator and selection of displayed options and commands.

13. The simulator training system as recited in claim 1 wherein said computer controlled system includes a computer image generation subsystem for providing realistic imagery on a screen to present said training scenario.

* * * * *